(12) United States Patent
Mühlemann

(10) Patent No.: US 10,814,538 B2
(45) Date of Patent: Oct. 27, 2020

(54) INJECTION MOULDING TOOL WITH ADJUSTABLE CORE CENTRING DEVICE

(71) Applicant: FOSTAG Formenbau AG, Stein am Rhein (CH)

(72) Inventor: Rolf Mühlemann, Schlattingen (CH)

(73) Assignee: FOSTAG FORMENBAU AG, Stein am Rhein (CH)

( * ) Notice: Subject to any disclaimer, the term of this patent is extended or adjusted under 35 U.S.C. 154(b) by 115 days.

(21) Appl. No.: 16/308,881

(22) PCT Filed: Mar. 28, 2017

(86) PCT No.: PCT/EP2017/057270
§ 371 (c)(1),
(2) Date: Dec. 11, 2018

(87) PCT Pub. No.: WO2017/215801
PCT Pub. Date: Dec. 21, 2017

(65) Prior Publication Data
US 2019/0283298 A1 Sep. 19, 2019

(30) Foreign Application Priority Data
Jun. 13, 2016 (CH) ........................................ 750/16

(51) Int. Cl.
*B29C 45/36* (2006.01)
*B29C 45/30* (2006.01)
(Continued)

(52) U.S. Cl.
CPC ............ *B29C 45/36* (2013.01); *B29C 33/304* (2013.01); *B29C 45/261* (2013.01);
(Continued)

(58) Field of Classification Search
CPC ... B29C 45/36; B29C 33/304; B29C 45/2606; B29C 45/261; B29C 2045/4078
See application file for complete search history.

(56) References Cited

U.S. PATENT DOCUMENTS 2,850,766 A * 9/1958 Press ...................... B29C 45/33
425/450.1
4,556,377 A 12/1985 Brown

FOREIGN PATENT DOCUMENTS

CN 2403567 Y 11/2000
DE 3140711 A1 4/1983
(Continued)

OTHER PUBLICATIONS

English translation of International Preliminary Report on Patentability, dated Dec. 18, 2018, with Written Opinion for PCT/EP2017/057270, filed Mar. 28, 2017.
(Continued)

*Primary Examiner* — Robert B Davis
(74) *Attorney, Agent, or Firm* — Paul D. Bianco; Gary S. Winer; Fleit Intellectual Property Law

(57) ABSTRACT

An injection moulding tool with at least one cavity for producing thin-walled, container-like injection-moulded products, in particular cups, tubes, tube heads, vials, bottle blanks or syringes. The injection moulding tool comprises a die holding plate, which has at least one cavity-forming die; a core holding plate, which has at least one core unit with a cavity-forming core; at least one stripping ring for stripping the injection-moulded product off the at least one core, with the at least one stripping ring arranged between the core holding plate and the die holding plate; and at least one adjustable core centring device for the fine alignment of the at least one core in the at least one die. The stripping ring is held in a floating manner in a stripping plate, which is arranged between the die holding plate and the core holding
(Continued)

plate; and the at least one adjustable core centring device is arranged between the core unit and the core holding plate.

20 Claims, 3 Drawing Sheets

(51) Int. Cl.
*B29C 45/26* (2006.01)
*B29C 45/40* (2006.01)
*B29C 33/30* (2006.01)
*B29C 45/80* (2006.01)
B29L 23/00 (2006.01)
B29L 31/00 (2006.01)
B29K 105/00 (2006.01)

(52) U.S. Cl.
CPC .......... *B29C 45/2606* (2013.01); *B29C 45/40* (2013.01); *B29C 45/80* (2013.01); B29C *2045/4078* (2013.01); *B29K 2105/258* (2013.01); *B29L 2023/00* (2013.01); *B29L 2031/7132* (2013.01)

(56) References Cited

FOREIGN PATENT DOCUMENTS

| | | |
|---|---|---|
| DE | 8714821 U1 | 2/1988 |
| JP | S5120258 A | 2/1976 |
| JP | H0588925 U | 12/1993 |
| WO | 2010/017622 A1 | 2/2010 |
| WO | 2012/055037 A1 | 5/2012 |

OTHER PUBLICATIONS

International Search Report dated Jun. 27, 2017 for PCT/EP2017/057270 filed Mar. 28, 2017.
Written Opinion for PCT/EP2017/057270 filed Mar. 28, 2017.

* cited by examiner

INJECTION MOULDING TOOL WITH ADJUSTABLE CORE CENTRING DEVICE

TECHNICAL FIELD

The invention relates to an injection moulding tool having at least one cavity for producing thin-walled, container-like injection-moulded articles, particularly cups, tubes, tube heads, small tubes, bottle blanks or syringes, comprising a die holding plate, which has at least one cavity-forming die; a core-holding plate, which has at least one core unit with cavity-forming core; at least one stripping ring for stripping the injection-moulded article from at least one core, wherein the at least one stripping ring is arranged between core-holding plate and die holding plate; and at least one adjustable core-centring device for the fine alignment of the at least one core with respect to the at least one die.

TECHNICAL BACKGROUND

During the production of thin-walled, container-like injection-moulded articles, particularly cups, tubes, tube heads, small tubes, bottle blanks or syringes, a uniform wall thickness is very important, as even small deviations in the wall thickness occurring during the cooling and unmoulding of the container may lead to pronounced deformations of the container due to volumetric shrinkage which occurs.

The cavities for such injection-moulded articles are always constructed by means of a die and a core arranged therein. In order to obtain a uniform wall thickness, the position of the core in a separation plane perpendicular to the closing direction of the moulding tool must therefore be aligned such that it is centred with the cavity-forming die. In multi-cavity moulding tools, each core is centred separately in this case. A separate centring of the cores in the respective die is important, in order to be able to obtain injection-moulded articles with uniform wall thicknesses with all cavities.

Known injection moulding tools for such thin-walled, container-like injection-moulded articles, such as for example the injection moulding tool illustrated in FIG. 1, comprise a die holding plate, in which at least one cavity-forming die unit or die is secured, a core-holding plate, on which at least one cavity-forming core unit or a core is held, and a stripping ring, which is arranged in a positive-fitting manner in a recess of the core unit and can be moved counter to the closing direction, in order to strip the finished injection-moulded article from the core after the opening of the moulding tool. The core or the core unit is mounted for setting the centring in a floating manner on the core-holding plate and is fixed in its position on the core-holding plate once correct centring has taken place by means of fastening means.

For fine centring of the core with respect to the die, a core-centring device is arranged between die unit and core unit. The core-centring device comprises a plurality of—at most four—centring strips, which have a centring surface which is inclined compared to the closing direction of the injection moulding tool and are supported on a correspondingly inclined contact surface of the core unit. By adding or removing adjustment films at the centring strips, the core can be centred exactly in the associated die. Each centring strip therefore forms a centring surface on the core unit, which corresponds to a centring surface on the die unit. As soon as the core and die are centred with respect to one another, the core unit is fixed on the core-holding plate and the moulding tool is ready for the production of the injection-moulded articles. If there are a plurality of core units, air gaps are present between adjacent core units for the individual centring of the individual units.

It is disadvantageous for the known structure, that the stripping ring and in particular the region of the core unit surrounding the stripping ring with the core-centring device must be sufficiently large and strongly dimensioned, in order to withstand large closing forces of 1000 kN or more. This leads to the diameter of the core units being substantially larger than the diameter of the cavity, which has a direct effect on the maximum number of cavities per moulding tool.

A further disadvantage consists in the fact that, during initial adjustment or during readjustment, the core-centring devices are poorly accessible and the injection moulding tool must be disassembled to a certain extent.

DESCRIPTION OF THE INVENTION

It is an object of the invention to specify an injection moulding tool for producing thin-walled, container-like injection-moulded articles, particularly cups, tubes, tube heads, small tubes, bottle blanks or syringes, in which the centring is easier to adjust and which allows a greater number of cavities per unit area.

This object is achieved by an injection moulding tool with features as described herein. The injection moulding tool having at least one cavity for producing thin-walled, container-like injection-moulded articles, particularly cups, tubes, tube heads, small tubes, bottle blanks or syringes, comprises a die holding plate, which has at least one cavity-forming die or die unit; a core-holding plate, which has at least one core unit with cavity-forming core; at least one stripping ring for stripping the injection-moulded article from at least one core, wherein the at least one stripping ring is arranged between core-holding plate and die holding plate; and at least one adjustable core-centring device for the exact alignment of the at least one core in the at least one die. The stripping ring is held in a floating manner in a stripping plate, which is arranged between die holding plate and core-holding plate. The at least one adjustable core-centring device is arranged between core unit and core-holding plate.

The adjustable core-centring device is as a result arranged behind the stripping ring between core-holding plate and core unit in the closing direction and can thus be positioned closer to the core with respect to a central axis (core axis) running through the core parallel to the closing direction. This in turn allows a reduction of the total diameter of the core units and the individual cavities of a multi-cavity injection moulding tool can be arranged closer to one another. As the stripping ring is held in a floating manner in the stripping plate, it adapts to a displacement of the core unit for fine centring the core in the die. In other words, the core unit or the core is centred from behind by means of the core-holding plate, in contrast to the prior art where the core unit is centred at the front by means of the die holding plate.

In the context of this invention, adjustable core centring device means a core-centring device, by means of which the position of the core can be displaced in a separation plane and centred relatively to the die, in order to obtain a cavity with uniform wall thicknesses. By contrast, the term fixed plate centring unit means a device using which the position of the various plates of the injection moulding tool in the closed state with respect to one another in the separation plane is determined in a displacement-free manner. An adjustment of the plate centring unit is not provided or not possible. The fixed plate centring unit is used for the fixed alignment and positioning of the individual plates with respect to one another. The adjustable core-centring device is used for the fine adjustment of the core inside the die. Closing direction means the direction in which the core is pushed relatively to the die when closing the moulding tool. Front is consequently defined by the front narrower region of the core.

To open the injection moulding tool, first the die holding plate with the at least one die is separated, along a first separation line between die holding plate and stripping plate, from the stripping plate together with the core-holding plate with the at least one core unit. Subsequently, the injection-moulded article is stripped from the core in that the stripping plate is separated and advanced along a second separation line between stripping plate and core-holding plate using the stripping ring.

In the closed state, the core unit or the core extends through the stripping ring or the stripping plate into the die and forms the cavity together with the die. The cavity is additionally formed by the stripping ring in a small region surrounding the core. The injection nozzle or the injection region may be arranged at the front, at the rear or at the side.

In some embodiments, at least one first fixed plate centring unit can be arranged between die holding plate and stripping plate and at least one second fixed plate centring unit can be arranged between stripping plate and core-holding plate, wherein the first and second plate centring units define a fixed, predetermined positioning of the die holding plate, stripping plate and core-holding plate with respect to one another in the closed state of the injection moulding tool. Die holding plate, stripping plate and core-holding plate are thus rigidly fixed with respect to one another in the separation plane and the position of the core in the die is then finely adjusted by means of the adjustable core-centring device.

In a few embodiments, an air gap is present along a peripheral outer surface of the stripping ring. In this manner, the stripping ring is mounted in a movable manner in a separation plane, in order to allow a displacement of the core unit for centring the core.

In some embodiments, the at least one adjustable core-centring device can be arranged on the stripping plate side in the core-holding plate. In a stripping plate side arrangement, the core-centring device is accessible for a renewed or correcting fine centring of the core when the injection moulding tool is completely open, i.e. when the stripping plate is advanced completely in the direction of the die holding plate during maintenance, without the injection moulding tool having to be partially disassembled.

In some embodiments, the stripping ring can be held in the stripping plate in a floating manner using at least one fastening element. The fastening element can form the first fixed plate centring unit between die holding plate and stripping plate at the same time. The fastening element can alternatively comprise two securing pins arranged parallel to one another and parallel to the separation plane, which secure the stripping ring at two opposite sides directly in the stripping plate or indirectly in the stripping plate, e.g. by means of the first fixed plate centring unit. The securing pins have sufficient play, so that the stripping ring is mounted in the stripping plate in a floating manner.

In some embodiments, the stripping ring can have a conical inner surface complementary to a conical sealing region, i.e. a conical outer surface of the core unit. Stripping ring and core unit are in this case constructed in such a manner, that during the closing of the injection moulding tool, the stripping ring is pushed rearwards through the die unit in the closing direction, and thus pressed in a sealing manner against the core unit. In order to achieve this, the stripping ring can with its conical inner surface have a prestress compared to the conical outer surface of the core unit, so that it is pressed by way of the conical inner surface in a sealing manner against the conical outer surface of the core unit during the closing of the injection moulding tool. In other words, the stripping ring can have a slight overdimension at the front, so that, in the closed state of the injection moulding tool, it is pushed rearwards through the die unit and in the process is pushed against the conical sealing surface of the core unit in a sealing manner. The cavity, which is delimited to some extent in the rear region by the stripping ring, is then closed in a sealing manner. Generally—even in the closed state of the injection moulding tool—an air gap is present between the stripping ring and stripping plate and between the rear end of the stripping ring in the closing direction and the core-holding plate, the core unit or the adjustable core-centring device. If, when the moulding tool is closed, the stripping ring is pushed all the way against the core-holding plate or core unit (i.e. there is no longer an air gap present), then the stripping ring 6 may also additionally stabilize the position of the core.

In some embodiments, the at least one core-centring device can have four centring strips with inclined centring surface arranged evenly around the core unit.

In some embodiments, the stripping ring can have a surrounding stop on the outer side, so that it is entrained by the stripping plate, which can be displaced forwards, to strip the injection-moulded article from the core. The fastening element for the stripping ring can likewise act on this surrounding stop.

BRIEF DESCRIPTION OF THE DRAWINGS

The invention shall be explained in more detail in the following on the basis of exemplary embodiments in connection with the drawing(s). In the figures.

WAYS OF IMPLEMENTING THE INVENTION

Figure 1:
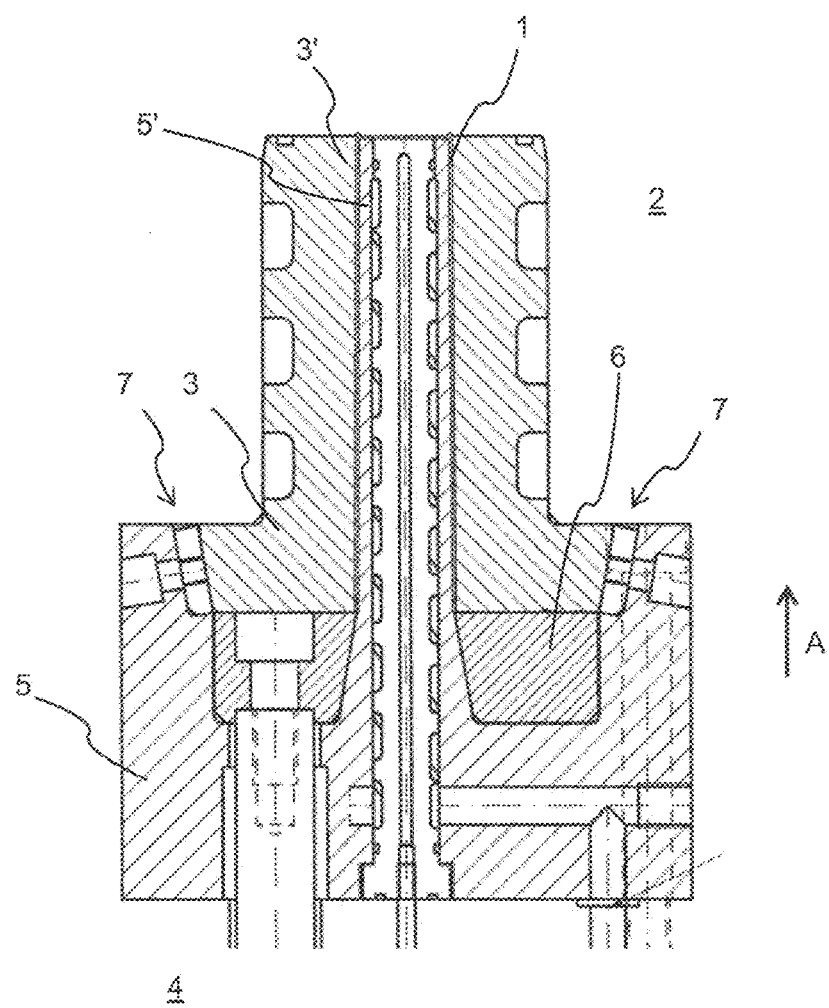
FIG. 1 shows a sectional illustration of an injection moulding tool according to the prior art with a core-centring device between core unit and die unit.

FIG. 1 shows a sectional illustration of an injection moulding tool according to the prior art. The injection moulding tool comprises a die holding plate 2 (only indicated) having at least one die unit 3, which forms the cavity-forming die 3', a core-holding plate 4 (only indicated), having at least one core unit 5, which forms the cavity-forming core 5', and a stripping ring 6. The stripping ring 6 is arranged in a positive-fitting manner in a recess between a core-forming region and a peripheral region of the core unit, so that to eject the injection-moulded article, it is possible to be advanced forwards along the core 5' by means of an actuating device 8. The core unit 5 is mounted in a floating manner on the core-holding plate 4 and can be fixed after centring has taken place. For fine centring of the core 5' inside the die 3', an adjustable core-centring device 7 is arranged between the peripheral region of the core unit 5 and a peripheral region of the die unit 3.

Figure 2:
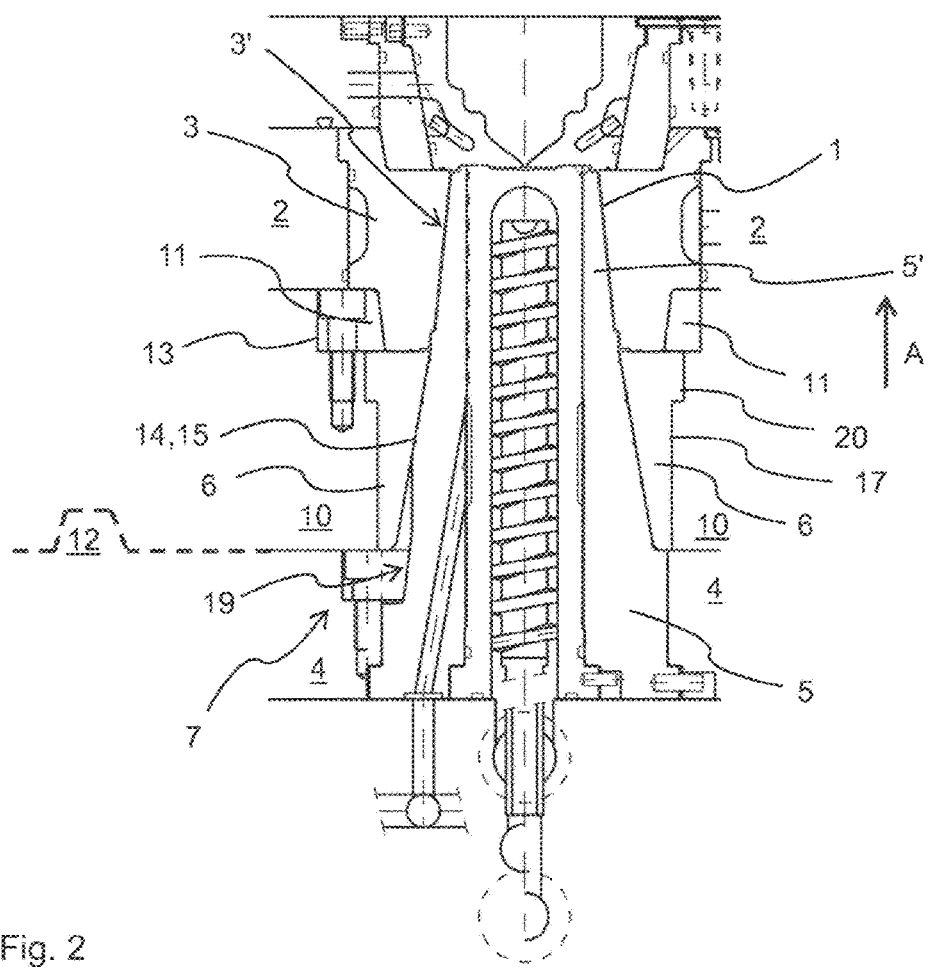
FIG. 2 shows a sectional illustration of an injection moulding tool with a core-side core-centring device and a floating stripping ring.

FIG. 2 shows a sectional illustration of an injection moulding tool with a core-side core-centring device 7 and a floating stripping ring 6. The injection moulding tool comprises a die holding plate 2, a core-holding plate 4 and a stripping plate 10. The die holding plate 2 holds at least one die unit 3 having a cavity-forming die 3'. The core-holding plate 4 holds at least one core unit 5 having a cavity-forming core 5'. A stripping plate 6 is mounted in the stripping plate 10 in a floating manner. In the closed state of the moulding tool, one core 5' and one die 3' form a cavity 1 in each case, which cavity is additionally delimited by the stripping ring 6 in the rear region. In this case, parts of the core unit 5 or the core 5' reach through the stripping ring 6 into the die 3'.

Figure 3:
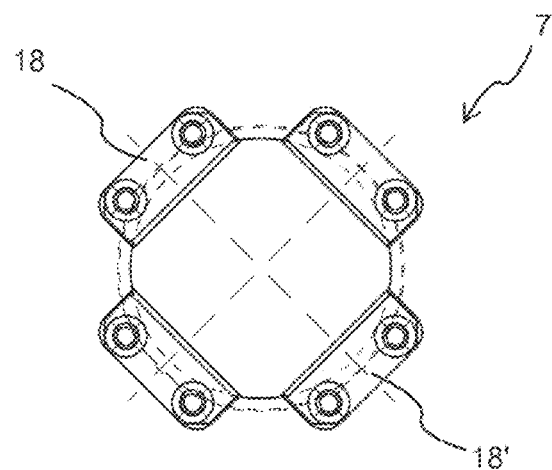
FIG. 3 shows a plan view onto a core-centring device.

In the injection moulding tool shown, the adjustable core-centring device 7 has a plurality of, preferably four, centring strips 18 arranged evenly around the core unit 5 (FIG. 3). The centring strips 18 have an inclined centring surface 19, which is complementary to an inclined centring surface on the core unit 5 in each case. The centring strips 18 can be screwed securely to the core-holding plate 4. For fine centring, adjustment films are then inserted or removed behind opposite centring strips 18, 18' in each case until the desired centring of the core 5' is achieved.

At least one first fixed plate centring unit 11 is arranged between the die holding plate 2 and the stripping plate 10, which determines a predetermined alignment of the two plates in the closed state of the moulding tool. A second fixed plate centring unit 12 is arranged between the stripping plate 10 and the core-holding plate 4, which determines a predetermined alignment of the two plates in the closed state of the moulding tool (indicated dashed in FIGS. 2 and 4). In the closed state of the moulding tool, the relative position of the die holding plate 2, the stripping plate 10 and the core-holding plate 4 with respect to one another is therefore fixed. The actual fine centring of the core 5' inside the die 3' takes place by means of the adjustable core-centring device 7. The fixed plate-centring devices 11, 12 have likewise inclined centring surfaces, which are complementary between the individual plates 2, 4, 10 in each case.

In the injection moulding tool shown in FIG. 2, the stripping ring 6 has a peripheral surrounding stop 20 or flange in the front region. On one side, the stop 20 engages into a shoulder in the stripping plate 10, so that the stripping ring 7 is entrained forwards for stripping an injection-moulded article by advancing the stripping plate 10 along the core 5', and on the other side is held in a floating manner in the stripping plate 10 by means of a fastening element 13. The fastening element 13 forms the first plate centring unit 11 at the same time.

The core unit 5 has a conical outer surface 14 adjacent to the core 5', which is complementary to a conical inner surface of the stripping ring 6. The conical inner surface of the stripping ring 6 has a prestress compared to the conical outer surface 14 of the core unit (i.e. it is configured with a slight overdimension at the front), so that the conical inner surface 15 thereof is pressed against the conical outer surface 14 of the core unit 5 during the closure of the moulding tool by means of the die unit 3'. A small air gap 17 is present along a peripheral outer surface of the stripping ring, i.e. between the stripping ring 6 and stripping plate 10. In the open state of the moulding tool, an air gap is present between the rear region of the stripping ring 6 and the core-holding plate 4 or the core-centring device 7 or the core unit 5, which air gap may still be present in the closed state, although smaller. If, when the moulding tool is closed, the stripping ring 6 is pressed all the way against the core-holding plate 4 or core unit 5 (i.e. there is no longer an 5 air gap present), then the stripping ring 6 may also additionally stabilize the position of the core 5'.

Figure 4:
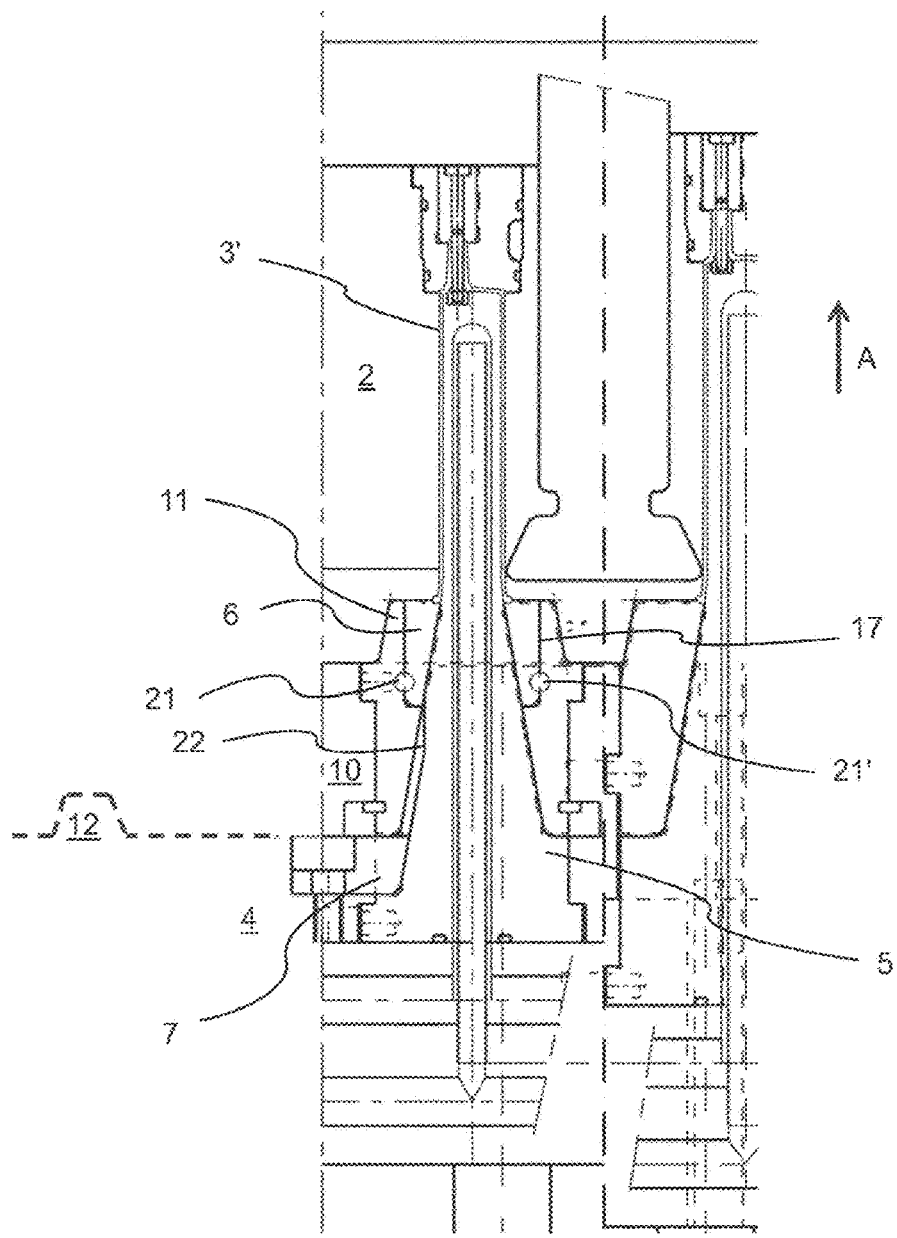
FIG. 4 shows a sectional illustration of an injection moulding tool with a core-side core-centring device and a floating stripping ring.

FIG. 4 likewise shows a sectional illustration of an injection moulding tool with a core-side core-centring 10 device 7 and a floating stripping ring 6. In contrast to the injection moulding tool from FIG. 2, the stripping ring 6 is held in the stripping plate 10 by means of two securing pins 21, 21' arranged parallel to one another and to the separation plane of the moulding tool. The securing 15 pins 21, 21' have sufficient play in order to ensure the floating mounting of the stripping ring, but prevent the stripping ring, which is mounted in a floating manner, from falling out after the stripping of an injection-moulded article from the core. In the embodiment shown, the 20 securing pins 21, 21' are held in the first fixed plate centring unit 11, which is in turn fastened on the stripping plate 10. Direct mounting in the stripping plate 10 is also possible. The securing pins 21, 21' also secure the stripping ring 6 against twisting.

A surrounding air gap 22 is present along the peripheral outer surface of the core unit, i.e. between the core unit 5 and the fixed plate centring unit 11, in order to permit a movement of the core unit 5 for centring the core 5'.

LIST OF REFERENCE NUMBERS

1 Cavity
2 Die holding plate
3, 3' Die unit/die
4 Core-holding plate
5, 5' Core unit/core
6 Stripping ring
7 Adjustable core-centring device
8 Actuating device
10 Stripping plate
11 First fixed plate centring unit
12 Second fixed plate centring unit
13 Fastening element
14 Conical outer surface
15 Conical inner surface
16 Rear end of the stripping ring
17 Air gap
18 Centring strip
19 Inclined centring surface
20 Stop
21, 21' Securing pin
22 Air gap
A Closing direction

The invention claimed is:

1. An injection molding tool having at least one cavity for producing thin-walled, container-like injection molded articles, the injection molding tool comprising:
a die holding plate, which has at least one cavity-forming die;
a core holding plate, which has at least one core unit with a cavity-forming core;
at least one stripping ring for stripping the injection molded article from the at least one core unit, wherein the at least one stripping ring is arranged between the core holding plate and the die holding plate; and
at least one adjustable core centering device for fine alignment of the at least one core unit in the at least one die, wherein the stripping ring is held in a floating manner in a stripping plate, which is arranged between the die holding plate and the core holding plate, and wherein the at least one adjustable core centering device is arranged between the core unit and the core holding plate.

2. The injection molding tool of claim 1, wherein at least one first fixed plate centering unit is arranged between die holding plate and stripping plate and at least one second fixed plate centering unit is arranged between the stripping plate and the core holding plate, wherein the first and second fixed plate centering units define a predetermined positioning of the die holding plate, the stripping plate and the core holding plate with respect to one another in the closed state of the injection molding tool.

3. The injection molding tool of claim 1, wherein an air gap is present along a peripheral outer surface of the stripping ring.

4. The injection molding tool of claim 1, wherein the at least one adjustable core centering device is arranged on the stripping plate side in the core holding plate.

5. The injection molding tool of claim 1, wherein the stripping ring is held in the stripping plate in a floating manner using at least one fastening element.

6. The injection molding tool of claim 5, wherein the fastening element forms the first fixed plate centering unit between die holding plate and stripping plate at the same time.

7. The injection molding tool of claim 5, wherein the fastening element has two parallel arranged securing pins, which hold the stripping ring in the stripping plate in a floating manner.

8. The injection molding tool of claim 1, wherein the stripping ring has a conical inner surface complementary to a conical outer surface of the core unit.

9. The injection molding tool of claim 8, wherein the stripping ring with the conical inner surface of the stripping ring has a prestress compared to the conical outer surface of the core unit, so that the stripping ring is pressed by the conical inner surface in a sealing manner against the conical outer surface of the core unit during closing of the injection molding tool.

10. The injection molding tool of claim 1, wherein the at least one core centering device has four centering strips with inclined centering surfaces arranged evenly around the core unit.

11. The injection molding tool of claim 1, wherein the stripping ring has a surrounding stop on the outer side, so that the stripping ring is entrained by the forward displaceable stripping plate to strip the injection molded article from the core.

12. The injection molding tool of claim 1, further including one or more adjustment films inserted behind the core centering device between the core holding plate and the core unit.

13. An injection molding tool having at least one cavity for producing thin-walled, container-like injection molded articles, the injection molding tool comprising:
at least one cavity forming die;
a die holding plate connected to the at least one cavity forming die;
at least one core unit having a cavity forming core;
a core holding plate connected to the at least one core unit;
a stripping plate arranged between the die holding plate and the core holding plate;
at least one stripping ring for stripping the injection molded article from the at least one core unit, the at least one stripping ring arranged between the core-holding plate and the die holding plate, the stripping ring held in a floating manner in the stripping plate; and
at least one adjustable core centering bar movably positionable between and in attachment to the core unit and the core-holding plate to thereby enable fine alignment of a position of the at least one core unit in the at least one die.

14. An injection molding tool having at least one cavity for producing thin-walled, container-like injection molded articles, the injection molding tool comprising:
at least one cavity forming die;
a die holding plate connected to the at least one cavity forming die;
at least one core unit having a cavity forming core;
a core holding plate connected to the at least one core unit;
a stripping plate arranged between the die holding plate and the core holding plate;
at least one stripping ring for stripping the injection molded article from the at least one core unit, the at least one stripping ring arranged between the core-holding plate and the die holding plate;
a plurality of centering bars arranged between the core unit and core holding plate, each bar positionable with respect to the core holding plate and the core unit to admit insertion against the bar of one or more shims to thereby enable a fine alignment of a position of the at least one core unit in the at least one cavity forming die.

15. The injection molding tool of claim 14, the stripping ring held in a floating manner in the stripping plate.

16. The injection molding tool of claim 14, the stripping ring movably secured in connection with the die through the use of a plurality of pins.

17. The injection molding tool of claim 14, the stripping ring movably secured in connection with the die through the use of a peripheral flange which engages a shoulder in the stripping plate.

18. The injection molding tool of claim 14, the plurality of bars each threadably secured to the core holding plate.

19. The injection molding tool of claim 14, the plurality of bars arranged between a peripheral region of the core unit and a peripheral region of the die.

20. The injection molding tool of claim 14, the plurality of bars each including an inclined surface complementary to an inclined surface of a core unit.

* * * * *